US010287982B2

(12) United States Patent
Duesler et al.

(10) Patent No.: US 10,287,982 B2
(45) Date of Patent: May 14, 2019

(54) FOLDED HEAT EXCHANGER FOR COOLED COOLING AIR

(71) Applicant: United Technologies Corporation, Hartford, CT (US)

(72) Inventors: Paul W. Duesler, Manchester, CT (US); Frederick M. Schwarz, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 816 days.

(21) Appl. No.: 14/826,905

(22) Filed: Aug. 14, 2015

(65) Prior Publication Data

US 2017/0044983 A1   Feb. 16, 2017

(51) Int. Cl.
*F02C 7/18*     (2006.01)
*F02K 3/115*    (2006.01)
(Continued)

(52) U.S. Cl.
CPC .............. *F02C 7/185* (2013.01); *F02C 7/141* (2013.01); *F02C 7/18* (2013.01); *F02C 7/20* (2013.01); *F02K 3/115* (2013.01); *F04D 29/5826* (2013.01); *F28D 1/0475* (2013.01); *F28D 7/06* (2013.01); *F04D 19/02* (2013.01); *F05D 2260/213* (2013.01); *F28D 2021/0026* (2013.01); *F28F 2009/222* (2013.01);
(Continued)

(58) Field of Classification Search
CPC .. F02C 7/18; F02C 7/141; F02C 7/185; F28F 9/24; F28F 9/0268; F28D 7/06; F28D 2021/0021; F28D 2021/0026; F28D 1/0475; F02K 3/115; F04D 29/5826; F05D 2260/213
See application file for complete search history.

(56) References Cited

U.S. PATENT DOCUMENTS 2,243,782 A    5/1941   Thornhill
3,117,624 A    1/1964   Johan
(Continued)

FOREIGN PATENT DOCUMENTS

EP    1010878    6/2000
EP    2339159    6/2011
(Continued)

OTHER PUBLICATIONS

Extended European Search Report dated Apr. 19, 2017 in European Application No. 16182828.0.
(Continued)

*Primary Examiner* — Ted Kim
(74) *Attorney, Agent, or Firm* — Snell & Wilmer, L.L.P.

(57) ABSTRACT

A heat exchanger (HEX) for cooling air in a gas turbine engine is provided. The HEX may comprise a central manifold comprising an inlet portion, a first outlet portion, and a second outlet portion. The HEX may further comprise a plurality of tubes coupled to the central manifold, the plurality of tubes comprising at least a first tube, a second tube, a third tube, and a fourth tube, a shroud at least partially encasing said plurality of tubes, and a cooling air flow path defined by at least one of the shroud, the plurality of tubes, and an outer surface of the central manifold, wherein the cooling air flow path is orthogonal to said plurality of tubes.

12 Claims, 11 Drawing Sheets

(51) Int. Cl.
*F02C 7/141* (2006.01)
*F02C 7/20* (2006.01)
*F04D 29/58* (2006.01)
*F28D 1/047* (2006.01)
*F28D 7/06* (2006.01)
*F28D 21/00* (2006.01)
*F04D 19/02* (2006.01)
*F28F 9/22* (2006.01)

(52) U.S. Cl.
CPC ....... *F28F 2245/00* (2013.01); *F28F 2250/06* (2013.01); *F28F 2255/00* (2013.01); *Y02T 50/675* (2013.01)

(56) References Cited

U.S. PATENT DOCUMENTS

| | | | |
|---|---|---|---|
| 3,770,290 A | | 11/1973 | Bottalico |
| 4,120,150 A | * | 10/1978 | Wakeman ............... F02C 7/185 |
| | | | 60/39.091 |
| 4,187,675 A | * | 2/1980 | Wakeman ............... F02C 7/185 |
| | | | 165/163 |
| 4,901,829 A | | 2/1990 | East, Jr. |
| 4,976,310 A | * | 12/1990 | Jabs ........................ F28D 7/06 |
| | | | 165/145 |
| 5,729,969 A | * | 3/1998 | Porte ........................ F02C 6/08 |
| | | | 60/226.1 |
| 5,782,077 A | * | 7/1998 | Porte ........................ F02C 6/08 |
| | | | 165/154 |
| 2001/0015059 A1 | | 8/2001 | Fetescu et al. |
| 2008/0256986 A1 | | 10/2008 | Ackermann |
| 2009/0025366 A1 | * | 1/2009 | Martinou ............... B64D 13/08 |
| | | | 60/266 |
| 2011/0088405 A1 | | 4/2011 | Turco |
| 2015/0377135 A1 | * | 12/2015 | Kupiszewski ............ F02C 3/04 |
| | | | 60/806 |

FOREIGN PATENT DOCUMENTS

| | | |
|---|---|---|
| EP | 2492472 | 8/2012 |
| GB | 2261941 | 6/1993 |
| WO | 2011141770 | 11/2011 |
| WO | 2015041855 | 3/2015 |

OTHER PUBLICATIONS

Extended European Search Report dated Jan. 19, 2017 in European Application No. 16182828.0.

Paul W. Duesler, et al., U.S. Appl. No. 15/062,400, filed Mar. 7, 2016 and entitled "Heat Exchanger for Cooled Cooling Air With Adjustable Damper".

European Patent Office, Extended European Search Report dated Jun. 1, 2017 in European Application No. 17151511.7.

USPTO, Restriction/Election Requirement dated Sep. 21, 2018 in U.S. Appl. No. 15/062,400.

USPTO, Pre-Interview First Office Action dated Nov. 20, 2018 in U.S. Appl. No. 15/062,400.

\* cited by examiner

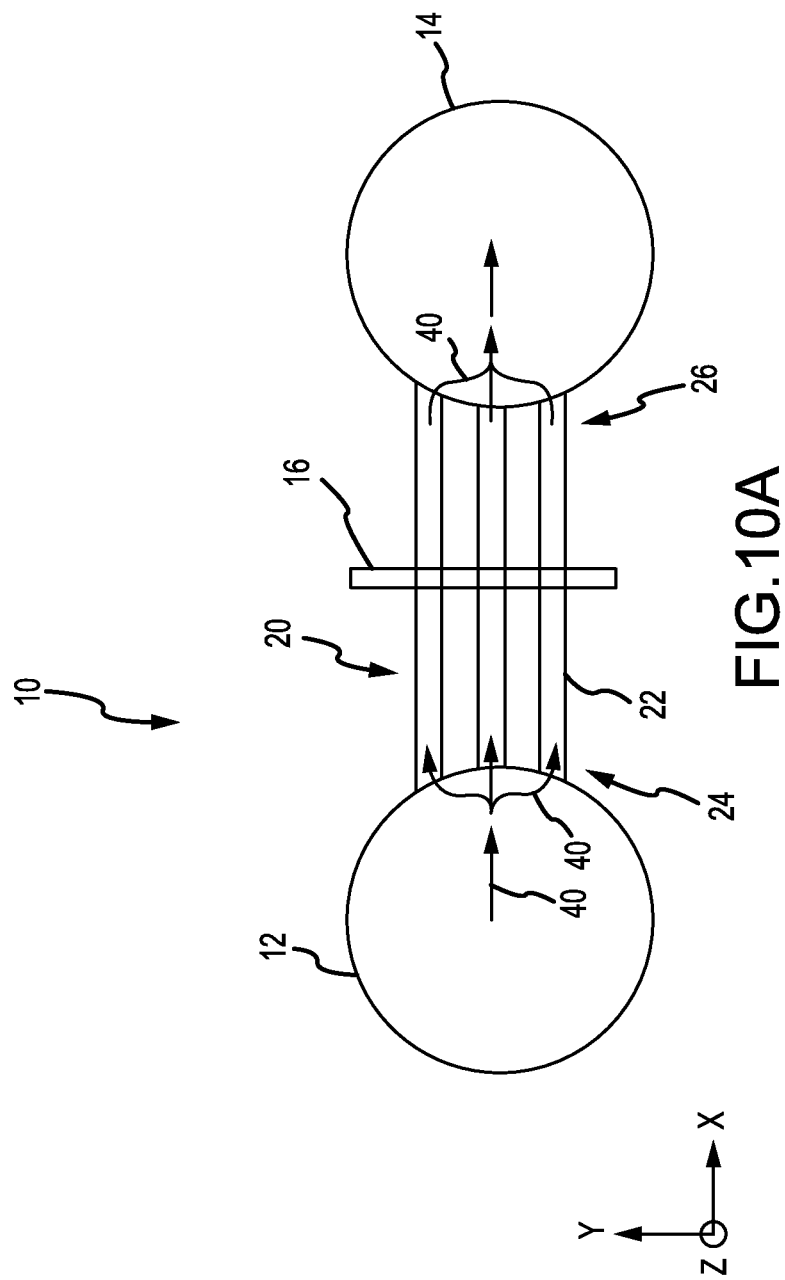

FOLDED HEAT EXCHANGER FOR COOLED COOLING AIR

FIELD

The present disclosure relates to gas turbine engines, and, more specifically, to heat exchangers (HEX) for cooling air of gas turbine engines.

BACKGROUND

As higher pressures are achieved in compressors of gas turbine engines, the temperature of compressed air in and/or leaving the compressors may increase as well. As a result, various components in a gas turbine engine may experience thermal stress. Thus, a heat exchanger (HEX) may be provided to cool hot air in a gas turbine engine.

SUMMARY

A heat exchanger for cooling air in a gas turbine engine may comprise a central manifold comprising an inlet portion, a first outlet portion, and a second outlet portion; a plurality of tubes coupled to the central manifold, the plurality of tubes comprising at least a first tube, a second tube, a third tube, and a fourth tube; a shroud at least partially encasing said plurality of tubes; and a cooling air flow path defined by at least one of the shroud, the plurality of tubes, and an outer surface of the central manifold, wherein the cooling air flow path is orthogonal to said plurality of tubes.

In various embodiments, the first outlet portion may be located on the opposite side of the inlet portion as the second outlet portion. In various embodiments, a flow area of at least one of first tube, second tube, third tube, and fourth tube may be less than 5% of the flow area of the inlet portion. In various embodiments, the cooling air flow path may receive air from a bypass flow path of the gas turbine engine. In various embodiments, the first tube may be in fluid communication with a first quadrant of the inlet portion and in fluid communication with a first half of the first outlet portion; the second tube may be in fluid communication with a second quadrant of the inlet portion and in fluid communication with a second half of the first outlet portion; the third tube may be in fluid communication with a third quadrant of the inlet portion and in fluid communication with a first half of the second outlet portion; and the fourth tube may be in fluid communication with a fourth quadrant of the inlet portion and in fluid communication with a second half of the second outlet portion. In various embodiments, the shroud may include a flow tab, the flow tab may be configured to contain the cooling air flow path in close proximity to the plurality of tubes. In various embodiments, the inlet portion may be configured to receive air from a high pressure compressor section of the gas turbine engine. In various embodiments, the heat exchanger may further comprise a first attachment feature configured to be fixed to the gas turbine engine and a second attachment feature configured to be coupled to the gas turbine engine, wherein the second attachment feature may freely expand away and contract towards the first attachment feature with the heat exchanger. In various embodiments, at least one of the inlet portion, the first outlet portion, and the second outlet portion may define a cylindrical void.

A gas turbine engine may comprise a compressor section. The gas turbine engine may further comprise an air-to-air heat exchanger in fluid communication with the compressor section. The air-to-air heat exchanger may comprise a central manifold comprising an inlet portion, a first outlet portion, and a second outlet portion, a plurality of tubes coupled to the central manifold, the plurality of tubes comprising at least a first tube, a second tube, a third tube, and a fourth tube, a shroud at least partially encasing said plurality of tubes, and a cooling air flow path defined by at least one of the shroud, the plurality of tubes, and an outer surface of the central manifold, wherein the cooling air flow path is orthogonal to said plurality of tubes.

In various embodiments, the first outlet portion may be located on the opposite side of the inlet portion as the second outlet portion. In various embodiments, a flow area of at least one of first tube, second tube, third tube, and fourth tube may be less than 5% of the flow area of the inlet portion. In various embodiments, the cooling air flow path may receive air from a bypass flow path of the gas turbine engine. In various embodiments, the first tube may be in fluid communication with a first quadrant of the inlet portion and in fluid communication with a first half of the first outlet portion; the second tube may be in fluid communication with a second quadrant of the inlet portion and in fluid communication with a second half of the first outlet portion; the third tube may be in fluid communication with a third quadrant of the inlet portion and in fluid communication with a first half of the second outlet portion; and the fourth tube may be in fluid communication with a fourth quadrant of the inlet portion and in fluid communication with a second half of the second outlet portion. In various embodiments, the shroud may include a flow tab, the flow tab may be configured to contain the cooling air flow path in close proximity to the plurality of tubes. In various embodiments, the inlet portion may be configured to receive air from a high pressure compressor section of the gas turbine engine. In various embodiments, the heat exchanger may further comprise a first attachment feature configured to be fixed to a gas turbine engine and a second attachment feature configured to be coupled to a gas turbine engine, wherein the second attachment feature may freely expand away and contract towards the first attachment feature with the heat exchanger. In various embodiments, at least one of the inlet portion, the first outlet portion, and the second outlet portion may define a cylindrical void.

A heat exchanger for a gas turbine engine may comprise a baffle comprising a cobalt alloy configured to form an oxidized layer over an outer surface of the baffle in response to an increase in temperature, the oxidized layer providing a lubricating surface, a tube inserted at least partially through the baffle, an inlet coupled to a first end of the tube, and an outlet coupled to a second end of the tube.

In various embodiments, the lubricating surface may be configured to allow the tube to easily slide across the lubricating surface in response to at least one of an increase and decrease in temperature.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 10A illustrates a cross-section view of a heat exchanger, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion. As used herein, "gas" and "air" may be used interchangeably.

Fuel efficiency of gas turbine engines is known to be proportional to the ratio of the exit pressure and the inlet pressure of the engine, or overall pressure ratio (OPR). As the OPR increases, the efficiency of the engine generally increases. However, a byproduct of OPR is high operating temperatures in various portions of the engine, such as the high pressure compressor for example. Materials used in gas turbine engines have temperature thresholds which cannot be surpassed for successful operation. Cooling air may be used to decrease operating temperatures of various components in a gas turbine engine. Generally, air from a compressor section of a gas turbine engine is used to cool other sections of the engine. However, as the OPR of gas turbine engines increases, the air from the compressor section may become increasingly hot. A heat exchanger (HEX) may be used to cool the air from a compressor section, thus providing cooled cooling air.

Figure 1:
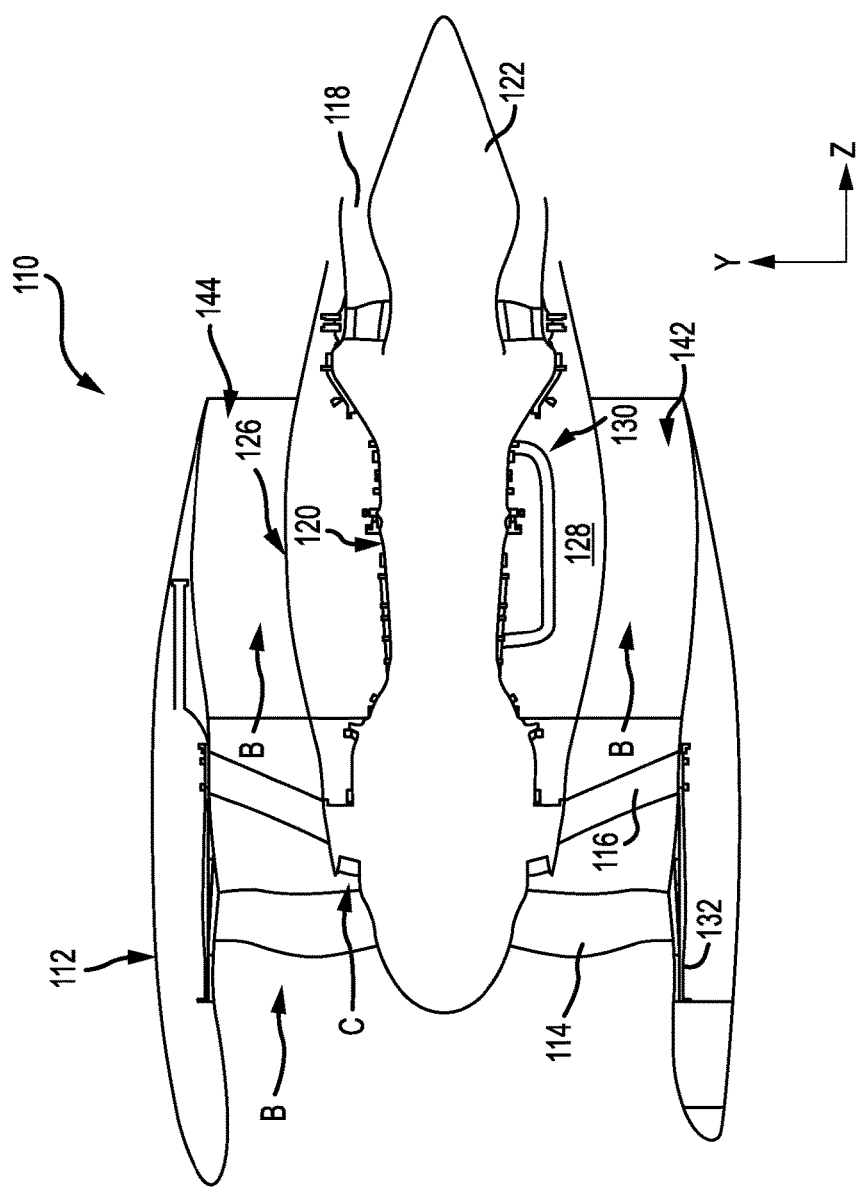
FIG. 1 illustrates a cross-sectional view of an exemplary gas turbine engine, in accordance with various embodiments.

FIG. 1 illustrates a schematic view of a gas turbine engine, in accordance with various embodiments. Gas turbine engine 110 may include core engine 120. Core air flow C flows through core engine 120 and is expelled through exhaust outlet 118 surrounding tail cone 122.

Core engine 120 drives a fan 114 arranged in a bypass flow path B. Air in bypass flow-path B flows in the aft direction (z-direction) along bypass flow-path B. At least a portion of bypass flow path B may be defined by nacelle 112 and inner fixed structure (IFS) 126. Fan case 132 may surround fan 114. Fan case 132 may be housed within fan nacelle 112.

Figure 2:
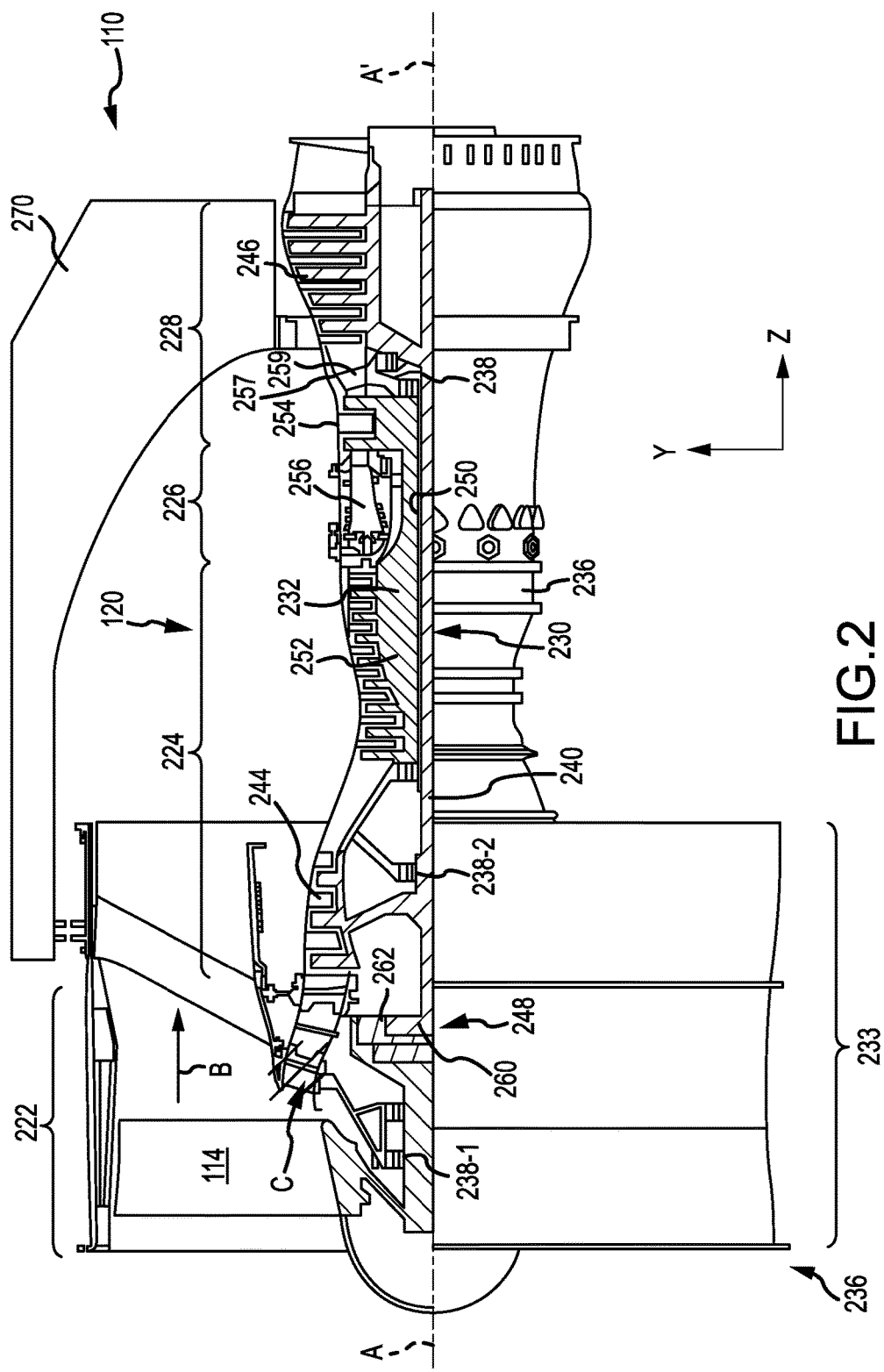
FIG. 2 illustrates a cross-sectional view of an exemplary gas turbine engine, in accordance with various embodiments.

With momentary reference to FIG. 2, nacelle 112 typically comprises two halves which are typically mounted to pylon 270. Fan case structure 233 may provide structure for securing gas turbine engine 110 to a pylon 160. According to various embodiments, multiple guide vanes 116 may extend radially between core engine 120 and IMC 134.

Upper bifurcation 144 and lower bifurcation 142 may extend radially between the nacelle 112 and IFS 126 in locations opposite one another to accommodate engine components such as wires and fluids, for example.

Inner fixed structure 126 surrounds core engine 120 and provides core compartments 128. Various components may be provided in core compartment 128 such as fluid conduits and/or a compressed air duct 130, for example. Compressed air duct 130 may be under high pressure and may supply compressed cooling air from a compressor stage to a high pressure turbine stage, for example. In various embodiments, a heat exchanger may be coupled to compressed air duct 130.

With respect to FIG. 2, elements with like element numbering as depicted in FIG. 1 are intended to be the same and will not necessarily be repeated for the sake of clarity.

In various embodiments and with reference to FIG. 2, a gas turbine engine 110 is provided. Gas turbine engine 110 may be a two-spool turbofan that generally incorporates a fan section 222, a compressor section 224, a combustor section 226 and a turbine section 228. Alternative engines may include, for example, an augmentor section among other systems or features. In operation, fan section 222 can drive air along a bypass flow-path B while compressor section 224 can drive air along a core flow-path C for compression and communication into combustor section 226 then expansion through turbine section 228. Although depicted as a turbofan gas turbine engine 110 herein, it should be understood that the concepts described herein are not limited to use with turbofans as the teachings may be applied to other types of turbine engines including three-spool architectures.

Gas turbine engine 110 may generally comprise a low speed spool 230 and a high speed spool 232 mounted for rotation about an engine central longitudinal axis A-A' relative to an engine static structure 236 via one or more bearing systems 238 (shown as bearing system 238-1 and bearing system 238-2 in FIG. 2). It should be understood that various bearing systems 238 at various locations may alternatively or additionally be provided including, for example, bearing system 238, bearing system 238-1, and bearing system 238-2.

Low speed spool 230 may generally comprise an inner shaft 240 that interconnects a fan 114, a low pressure (or first) compressor section 244 and a low pressure (or first) turbine section 246. Inner shaft 240 may be connected to fan 114 through a geared architecture 248 that can drive fan 114 at a lower speed than low speed spool 230. Geared architecture 248 may comprise a gear assembly 260 enclosed within a gear housing 262. Gear assembly 260 couples inner shaft 240 to a rotating fan structure. High speed spool 232 may comprise an outer shaft 250 that interconnects a high-pressure compressor ("HPC") 252 (e.g., a second compressor section) and high pressure (or second) turbine section 254. A combustor 256 may be located between HPC 252 and high pressure turbine 254. A mid-turbine frame 257 of engine static structure 236 may be located generally between high pressure turbine 254 and low pressure turbine 246. Mid-turbine frame 257 may support one or more bearing systems 238 in turbine section 228. Inner shaft 240 and outer shaft 250 may be concentric and rotate via bearing systems 238 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 244 then HPC 252, mixed and burned with fuel in combustor 256, then expanded over high pressure turbine 254 and low pressure turbine 246. Mid-turbine frame 257 includes airfoils 259 which are in the core airflow path. Low pressure turbine 246 and high pressure turbine 254 rotationally drive the respective low speed spool 230 and high speed spool 232 in response to the expansion.

Gas turbine engine 110 may be, for example, a high-bypass geared aircraft engine. In various embodiments, the bypass ratio of gas turbine engine 110 may be greater than about six (6). In various embodiments, the bypass ratio of gas turbine engine 110 may be greater than ten (10). In various embodiments, geared architecture 248 may be an epicyclic gear train, such as a star gear system (sun gear in meshing engagement with a plurality of star gears supported by a carrier and in meshing engagement with a ring gear) or other gear system. Geared architecture 248 may have a gear reduction ratio of greater than about 2.3 and low pressure turbine 246 may have a pressure ratio that is greater than about 5. In various embodiments, the bypass ratio of gas turbine engine 110 is greater than about ten (10:1). In various embodiments, the diameter of fan 114 may be significantly larger than that of the low pressure compressor 244, and the low pressure turbine 246 may have a pressure ratio that is greater than about 5:1. Low pressure turbine 246 pressure ratio may be measured prior to inlet of low pressure turbine 246 as related to the pressure at the outlet of low pressure turbine 246 prior to an exhaust nozzle. It should be understood, however, that the above parameters are exemplary of various embodiments of a suitable geared architecture engine and that the present disclosure contemplates other gas turbine engines including direct drive turbofans. FIG. 1 and FIG. 2 provide a general understanding of the sections in a gas turbine engine, and is not intended to limit the disclosure. The present disclosure may extend to all types of turbine engines, including turbofan gas turbine engines and turbojet engines, for all types of applications.

Figure 3:
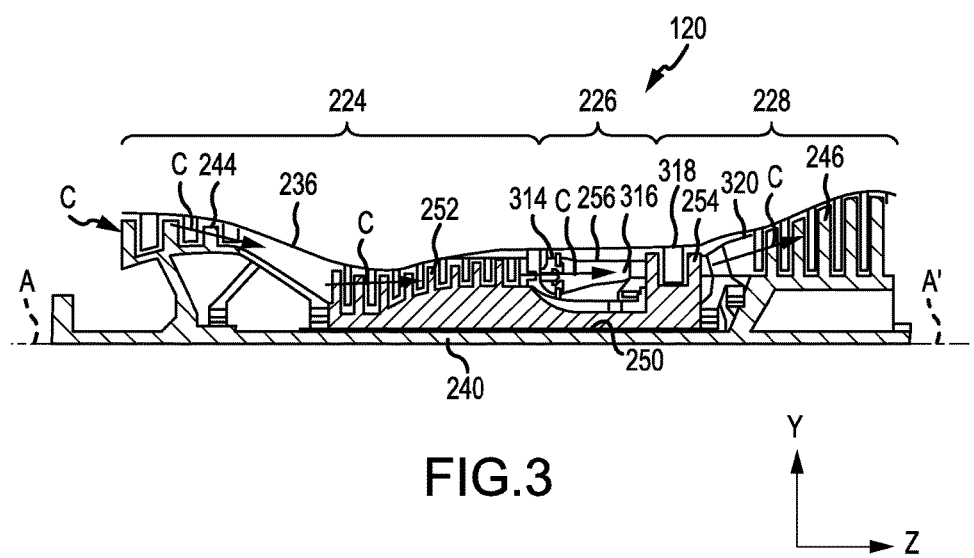
FIG. 3 illustrates the primary-flow gas path in a gas turbine engine through the low pressure compressor, high-pressure compressor, combustor, high-pressure turbine, and low-pressure turbine, in accordance with various embodiments.

With respect to FIG. 3, elements with like element numbering as depicted in FIG. 1 and FIG. 2 are intended to be the same and will not necessarily be repeated for the sake of clarity.

FIG. 3 illustrates the primary flow gas path through core engine 110, in accordance with various embodiments. Core engine 110 may include engine static structure 236, low-pressure compressor 244, high-pressure compressor 252, combustor 256, high-pressure turbine 254, and low-pressure turbine C. Engine static structure 236 may be referred to as an engine case. Gas may flow into low-pressure compressor 244 along gas path C. Gas flowing through low-pressure compressor 244 along gas path C may be compressed, resulting in an increase in pressure and temperature relative to the pressure and temperature upon entering low-pressure compressor 244. Gas may flow into high-pressure compressor 252 along gas path C. Gas flowing through high-pressure compressor 252 along gas path C may be compressed, resulting in an increase in pressure and temperature relative to the pressure and temperature upon entering high-pressure compressor 252. Uncombusted gas in gas path C leaving high-pressure compressor 252 may be referred to as T3 gas. T3 gas may have a varying temperature at different engine speeds. The temperature of T3 gas may be about 400° F. (205° C.) when core engine 110 is at idle speeds and may reach about 1,400° F. (760° C.) or higher as core engine 110 accelerates for takeoff, where the term "about" in this context only may refer to +/−200° F. Different engines may have higher temperatures or lower temperatures at each stage. T3 gas may be present at location 314 of core engine 110. T3 gas leaving the high-pressure compressor 252 may then flow into combustor 256 to supply combustor 256 with air for combustion.

In various embodiments, uncombusted T3 gas may be mixed with fuel and burned in combustor 256. Combusted gas in combustor 256 may be referred to as T4 gas. T4 gas may leave combustor 256 and enter high-pressure turbine 254. T4 gas may reach or exceed temperatures of up to 3,500° F. (1,925° C.) or higher. T4 gas may be located at location 316, for example. T4 gas leaving combustor may follow gas path C to drive high-pressure turbine 254.

In various embodiments, combusted gas that has entered, but not exited, high-pressure turbine 254 may be identified as T4.25 gas. T4.25 gas may be significantly cooler than T4 gas exiting combustor 256. For example, T4.25 gas may be at temperatures of about 1,000° F.-2,000° F. (537° C.-1,093° C.), where the term "about" in this context only may refer to +/−500° F. T4.25 gas may be located at location 318, for example. The T4.25 gas then follows out high-pressure turbine 254 and into low-pressure turbine 246 along gas path C.

In various embodiments, combusted gas exiting high-pressure turbine 254 and entering low-pressure turbine 246 may be referred to as T4.5 gas. T4.5 gas may be cooler than T4.25 gas found in the high-pressure compressor or T4 gas exiting the combustor. For example, T4.5 gas may be about 1,500° F. (815° C.) degrees at idle, where the term "about" in this context only may refer to +/−500° F. T4.5 gas may be located at location 320 in gas path C, for example. The T4.5 gas then follows gas path C into low-pressure turbine 246.

Figure 4:
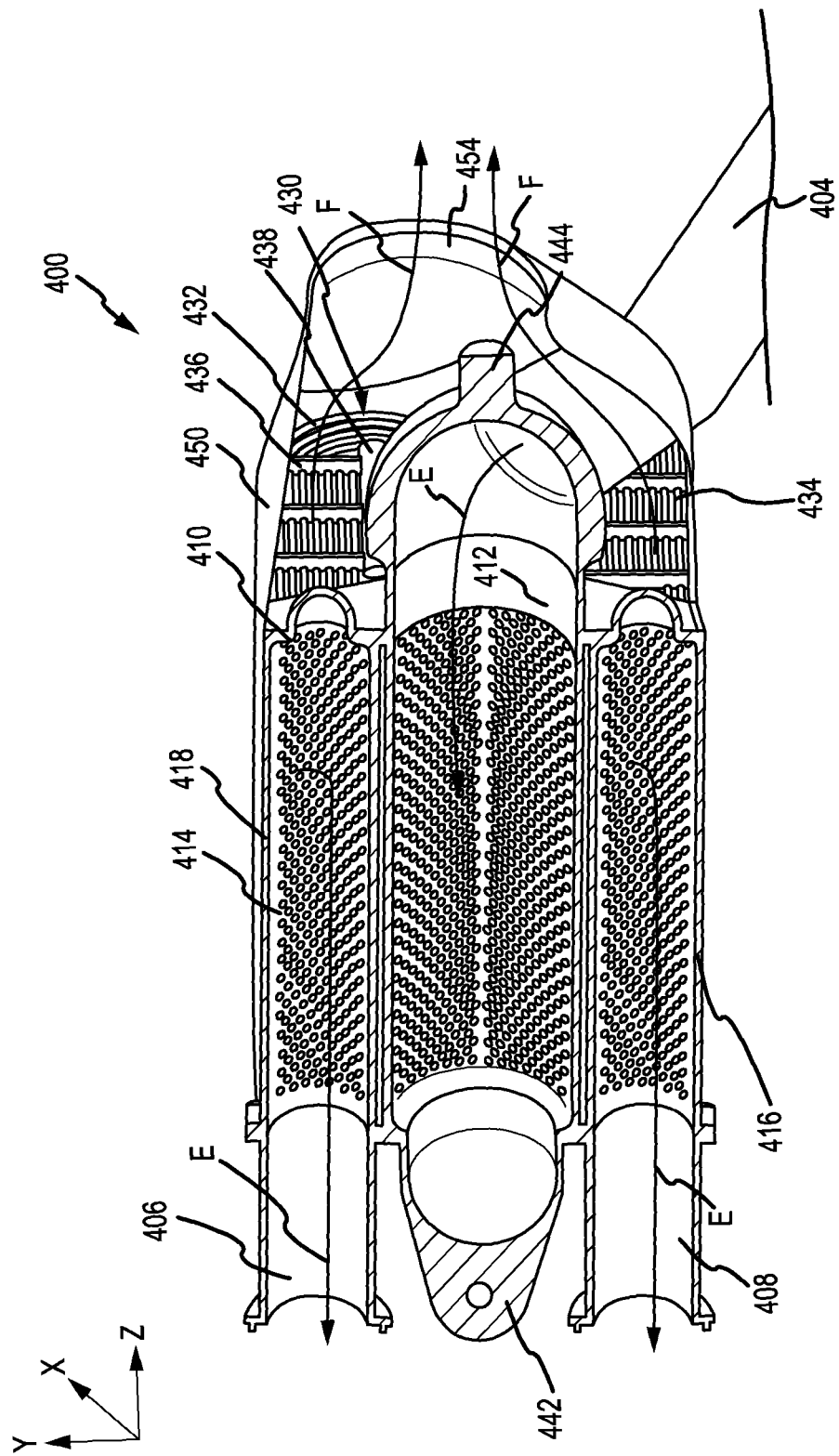
FIG. 4 illustrates a cross-sectional view of a heat exchanger, in accordance with various embodiments.

With reference to FIG. 4, a cross-section view of a heat exchanger (HEX) 400 is illustrated. An x-y-z axis is provided for ease of illustration. In various embodiments, HEX 400 may comprise a central manifold 410 and a plurality of tubes 430. In various embodiments, central manifold 410 may comprise an inlet portion 412, a first outlet portion 414, and a second outlet portion 416. In various embodiments, first outlet portion 414 may be located on the opposite side of inlet portion 412 as second outlet portion 416. In various embodiments, first outlet portion 414 may be located adjacent to inlet portion 412 (in the positive y-direction). In various embodiments, second outlet portion 416 may be located adjacent to inlet portion 412 (in the negative y-direction). In various embodiments, inlet portion 412, first outlet portion 414, and second outlet portion 416 may each individually define a cylindrical void. In various embodiments, HEX 400 may further comprise a shroud 450. In various embodiments, shroud 450 may be coupled to central manifold 410. Shroud 450 may at least partially encase central manifold 410 and tubes 430.

In various embodiments, a plurality of baffles, such as baffle 436 for example, may be coupled to plurality of tubes 430. Baffle 436 may comprise a plurality of apertures into which plurality of tubes 430 are inserted. Baffle 436 may add to the stiffness of plurality of tubes 430. In various embodiments, with momentary reference to FIG. 1, the number of baffles installed over plurality of tubes 430 may be determined by the highest operating frequency of gas turbine engine 110. For example, baffles, such as baffle 436 may be installed over plurality of tubes 430 until the natural frequency of plurality of tubes 430 is higher than the highest operating frequency of gas turbine engine 110. In various embodiments, a baffle support 438 may be coupled to baffle 436.

With reference now to FIG. 3 and FIG. 4, in various embodiments, central manifold 410 and/or plurality of tubes 430 may be made of a high performance nickel-chromium alloy such as an austenitic nickel-chromium-based superalloy (e.g., INCONEL or HAYNES 282), metals, ceramics, or other materials suitable to withstand T3 gas temperatures that may exceed 1,100° F. (593° C.) degrees when core engine 120 is operating at takeoff speeds.

With respect to FIG. 5, FIG. 6, FIG. 7A, FIG. 7B, and FIG. 8, elements with like element numbering as depicted in FIG. 4 are intended to be the same and will not necessarily be repeated for the sake of clarity.

Figure 5:
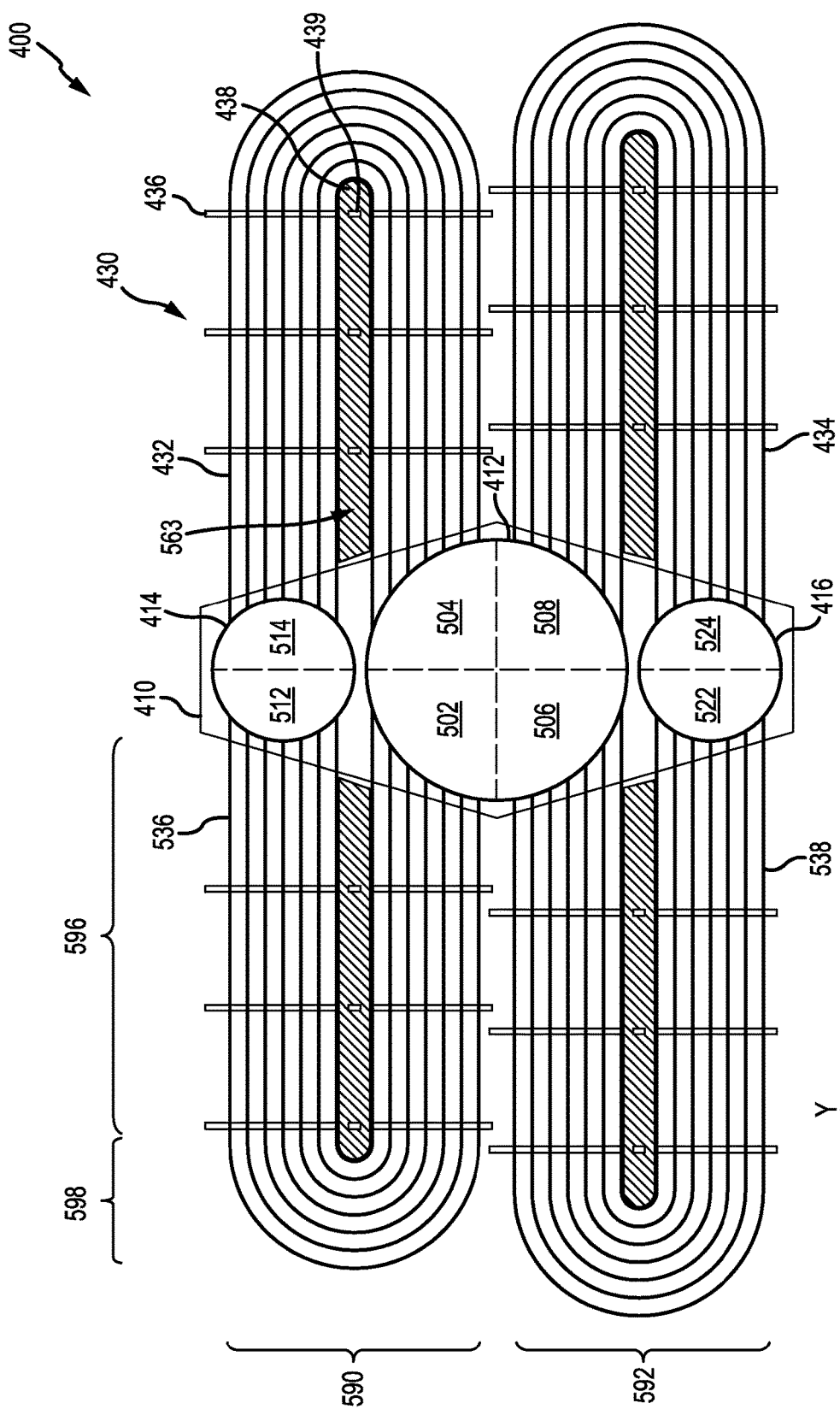
FIG. 5 illustrates a cross-sectional view of a heat exchanger, in accordance with various embodiments.

With reference now to FIG. 5, inlet portion 412 may comprise four quadrants including quadrant 502 (also referred to herein as "first quadrant"), quadrant 504 (also referred to herein as "second quadrant"), quadrant 506 (also referred to herein as "third quadrant"), and quadrant 508 (also referred to herein as "fourth quadrant"). First outlet portion 414 may comprise first half 512 and second half 514. Second outlet portion 416 may comprise first half 522 and second half 524. In various embodiments, a plurality of tubes, including tube 432, may be coupled between quadrant 504 of inlet portion 412 and second half 514 of first outlet portion 414. In various embodiments, a plurality of tubes, including tube 434, may be coupled between quadrant 508 of inlet portion 412 and second half 524 of second outlet portion 416. In various embodiments, a plurality of tubes, including tube 536, may be coupled between quadrant 502 of inlet portion 412 and first half 512 of first outlet portion 414. In various embodiments, a plurality of tubes, including tube 538, may be coupled between quadrant 506 of inlet portion 412 and first half 522 of second outlet portion 416. Accordingly, inlet portion 412 may be in fluid communication with first outlet portion 414 and in fluid communication with second outlet portion 416. In various embodiments, central manifold 410 may comprise a hexagonal geometry as illustrated in FIG. 5. In various embodiments, central manifold 410 may comprise an octagonal, square, ovular, elliptical, and/or any other geometry.

In various embodiments, as illustrated in FIG. 5, tube 536 may comprise a straight portion 596 and a rounded portion 598. Accordingly, tube 536 may be folded, in half for example. Thus, HEX may be referred to as having a folded tube design.

In various embodiments, plurality of tubes 430 may comprise an upper stack (also referred to herein as "first stack") 590 and a lower stack (also referred to herein as a "second stack") 592. In various embodiments, with momentary reference to FIG. 4 and FIG. 8, baffle support 438 may be configured to block air in cooling air flow path F from entering the void 563 located in the middle of upper stack 590 of plurality of tubes 430. In various embodiments, baffle support 438 may provide support for a plurality of baffles such as baffle 436. In various embodiments, baffle support 438 may comprise a plurality of apertures, such as aperture 439, through which at least a portion of a plurality of baffles, such as a portion of baffle 436, may be inserted and coupled to baffle support 438. In various embodiments, baffle support 438 may be welded, soldered, brazed, or otherwise suitably coupled to baffle 436. One or more baffle supports may be located within the void in the middle of lower stack 592 in a similar manner as baffle support 438.

With reference now to FIG. 4, inlet portion 412 may include a first attachment feature 442 and a second attachment feature 444. In various embodiments, first attachment feature 442 may define a hemispherical void. In various embodiments, second attachment feature 444 may define a hemispherical void. In various embodiments, first attachment feature 442 may be detachably coupled to inlet portion 412. In various embodiments, first attachment feature 442 may be permanently coupled to inlet portion 412. For example, first attachment feature 442 may be welded, soldered, brazed, or otherwise suitably coupled to inlet portion 412. In various embodiments, second attachment feature 444 may be detachably coupled to inlet portion 412. In various embodiments, second attachment feature 444 may be permanently coupled to inlet portion 412. For example, second attachment feature 444 may be welded, soldered, brazed, or otherwise suitably coupled to inlet portion 412.

In various embodiments, air may enter HEX 400 via inlet tube 404. In various embodiments, HEX 400 may be coupled via inlet tube 404 to a high pressure compressor such as high-pressure compressor 252 of FIG. 2 and FIG. 3. Accordingly, HEX 400 may be in fluid communication via inlet portion 412 with a compressor section 224 of a gas turbine engine. In various embodiments, HEX 400 may be coupled via inlet tube 404 to a compressor section, combustor section, and/or a turbine section of a gas turbine engine. In various embodiments, HEX 400 may be coupled to any portion of a gas turbine engine.

In various embodiments, HEX 400 may comprise hot air flow path E. Hot air flow path E may be defined by inlet portion 412, plurality of tubes 430, first outlet portion 414, and/or second outlet portion 416. Upon entering inlet portion 412 via inlet tube 404, air may follow hot air flow path E and enter the plurality of tubes 430 from inlet portion 412 and then exit the plurality of tubes 430 into one of first outlet portion 414 and/or second outlet portion 416. For example, air may enter inlet portion 412, then enter tube 432, next it may exit tube 432 into first outlet portion 414, and finally exit first outlet portion 414 via first outlet tube 406. In a further example, air may enter inlet portion 412, then enter tube 434, next it may exit tube 434 into second outlet portion 416, and finally exit second outlet portion 416 via second outlet tube 408. Air exiting either first outlet portion 414 or second outlet portion 416 may be used to cool various portions of a gas turbine engine. In various embodiments, while in plurality of tubes 430, air in hot air flow path E may transfer heat to air in cooling air flow path F.

In various embodiments, inner surface 454 of shroud 450 may at least partially define a cooling air flow path F. Outer surface 418 of central manifold 410 may at least partially define cooling air flow path F. The outer surface of the plurality of tubes 430 may at least partially define cooling air flow path F. In various embodiments, air from bypass flow path 124 of FIG. 1 may enter cooling air flow path F. In various embodiments, air in cooling air flow path F may flow generally in an aft direction (positive z-direction). In various embodiments, heat from air in the plurality of tubes 430 may be transferred to air in cooling air flow path F. In various embodiments, the transfer of heat may occur in a convective manner. Accordingly, the temperature of air in inlet portion 412 may be greater than the temperature of air in first outlet portion 414 and second outlet portion 416. In various embodiments, the flow of air in plurality of tubes 430 may be orthogonal to the flow of air in cooling air flow path F. Thus, the flow of air in tubes 430 and the flow of air in cooling air flow path F may comprise a cross-flow. Accordingly, plurality of tubes 430 may extend in a direction which is orthogonal to cooling air flow path F.

In various embodiments, a pressure gradient may exist between air in hot air flow path E and cooling air flow path F. In various embodiments, as previously mentioned, inlet portion 412, first outlet portion 414, and second outlet portion 416 may each individually define a cylindrical void as shown in FIG. 4 and FIG. 5. In various embodiments, air pressure in inlet portion 412 may reach up to 500 pounds per square inch absolute (500 psia) (3,447,378.6 Pascal) or more, while air pressure in cooling air flow path F may generally vary between 14.7 psia (101,352.9 Pascal) and 21 psia (144,789.9 Pascal). In various embodiments, the cylindrical geometry of inlet portion 412, first outlet portion 414, and second outlet portion 416 may be ideal to handle the amount of pressure experienced by these portions. In various embodiments, air entering hot air flow path E may reach temperatures of about 1,400° F. (760° C.) or higher. In various embodiments, with reference to FIG. 3, air entering hot air flow path E may comprise T3 gas. In various embodiments, air entering cooling air flow path F may reach temperatures of about 100° F. (38° C.) or higher. In various embodiments, air entering cooling air flow path F may comprise engine bypass air. In various embodiments, engine bypass air may comprise air from bypass flow path 124 of FIG. 1.

Figure 8:
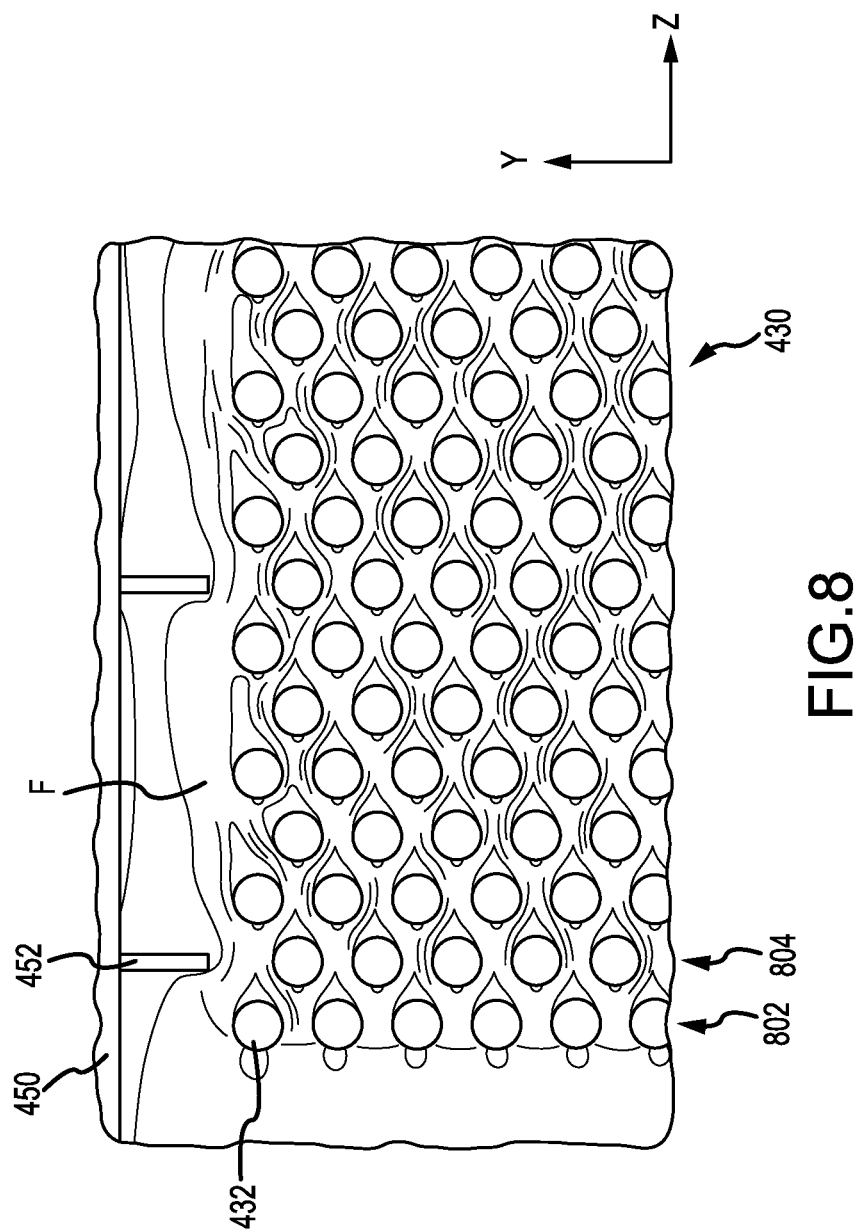
FIG. 8 illustrates a cross-sectional view of a cooling air flow path through heat exchanger tubes installed in an alternating manner, in accordance with various embodiments.

With reference to FIG. 8, cross-section view of plurality of tubes 430 installed in an alternating manner with a detailed view of cooling air flow path F is illustrated, according to various embodiments. An x-y-z axis is provided for ease of illustration. In various embodiments, plurality of tubes 430 may be installed in an alternating manner. For example, column 804 of plurality of tubes 430 may be offset (in the y-direction) from column 802 such that column 804 is not directly behind (in the z-direction) column 802. Installing tubes 430 in an alternating manner may aide in more efficiently transferring heat from air in plurality of tubes 430 to air in flow path F.

In various embodiments, shroud 450 may include flow tab 452. In various embodiments, flow tab 452 may comprise a tab or panel. In various embodiments, flow tab 452 may be configured to contain cooling air flow path F in close proximity to plurality of tubes 430 which may aide in more efficiently transferring heat from air in plurality of tubes 430 to air in flow path F.

Figure 6:
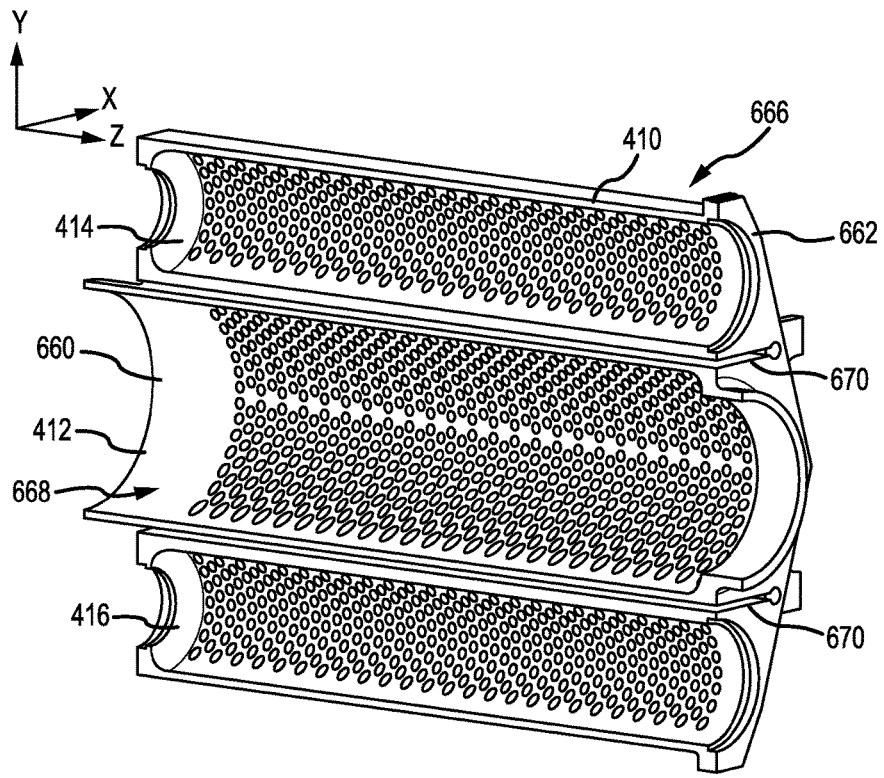
FIG. 6 illustrates a cross-sectional view of a central manifold, in accordance with various embodiments.

With reference to FIG. 6, a cross-section view of a central manifold 410 is illustrated. An x-y-z axis is provided for ease of illustration. In various embodiments, central manifold 410 may comprise one or more relief cuts 670. Relief cut 670 may be located between inlet portion 412 and first outlet portion 414. Relief cut 670 may be located between inlet portion 412 and second outlet portion 416. Relief cut 670 may be configured to relieve stress from central manifold 410 as central manifold 410 expands and contracts in response to an increase and decrease in temperature respectively. In various embodiments, central manifold 410 may comprise a plurality of apertures 660 such as aperture 662 for example. With momentary reference to FIG. 4, plurality of apertures 660 may be configured to receive plurality of tubes 430. Plurality of tubes 430 may be inserted from an outer surface 666 of central manifold 410 to an inner surface 668 of central manifold 410 in the x-direction. In various embodiments, plurality of tubes 430 may be detachably coupled to central manifold 410. In various embodiments, plurality of tubes 430 may be permanently coupled to central manifold 410. For example, tube 432 may be welded, soldered, brazed, or otherwise suitably coupled to central manifold 410 via aperture 662. In various embodiments, plurality of tubes 430 may be flush with inner surface 668 when in an installed position. In various embodiments, plurality of tubes 430 may protrude radially inward from inner surface 668 when in an installed position.

Figure 7A:
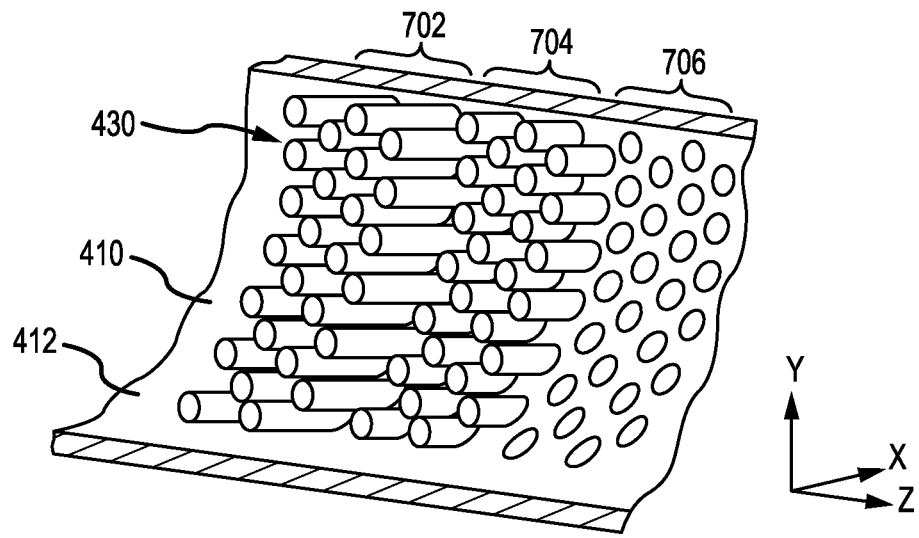
FIG. 7A illustrates a cross-sectional view of part of a central manifold with tubes installed in a stepped manner, in accordance with various embodiments.
Figure 7B:
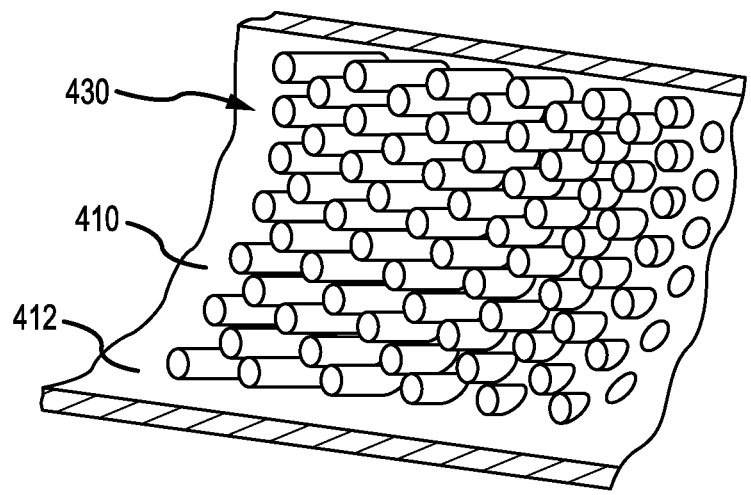
FIG. 7B illustrates a cross-sectional view of part of a central manifold with tubes installed with a smooth change in radial position, in accordance with various embodiments.

With reference to FIG. 7A, plurality of tubes 430 are illustrated in an installed position in a stepped fashion, according to various embodiments. Plurality of tubes 430 may comprise various sections of tubes, each installed at different radial positions. For example, plurality of tubes 430 may comprise various sections of tubes such as section 702, section 704, and section 706. In various embodiments, section 702 may protrude further radially inward than section 704. In various embodiments, section 704 may protrude further radially inward than section 706. In various embodiments, with momentary reference to FIG. 7B, plurality of tubes 430 may comprise a gradual or smooth change in radial position as illustrated in FIG. 7B, as opposed to a stepped change as illustrated in FIG. 7A. In various embodiments, inlet portion 412 may comprise a pressure gradient along the axial direction (z-direction). Installing plurality of tubes 430 in a stepped fashion may compensate for such pressure gradient resulting in a more uniform flow through plurality of tubes 430. In various embodiments, plurality of tubes 430 may be pre-cut to size before installing into central manifold 410. In various embodiments, plurality of tubes 430 may be installed into central manifold 410 and then cut to length when in the installed position. For example, each tube of plurality of tubes 430 may comprise a similar length, installed into central manifold 410, and then cut to various lengths according to pre-determined specifications. In various embodiments, one or more orifices may be coupled to an inlet of plurality of tubes 430 in order to meter the flow of air through plurality of tubes 430.

In various embodiments, each tube included in plurality of tubes 430 may comprise a physical flow area which is less than 5% of the flow area of inlet portion 412. With further reference to FIG. 4, inlet portion 412 may comprise inner diameter 478, where the flow area of inlet portion 412 is calculated as π times one fourth times inner diameter 478 squared, or $(\pi/4)*($inner diameter 478$)^2$. Similarly, the inner diameter of each tube included in plurality of tubes 430 may comprise a flow area. For example, according to various embodiments, tube 432 may comprise a flow area which is less than 5% of the flow area of inlet portion 412. In various embodiments, tube 432 may comprise a flow area in the range from about 1% to about 7% of the flow area of inlet portion 412, wherein the term "about" in this context can only mean +/−1%. Minimizing the flow area of tube 432 may allow room for more tubes to be included in plurality of tubes 430, thus increasing the overall surface area of plurality of tubes 430. Increasing the overall surface area of plurality of tubes 430 may increase the rate at which heat may be transferred from air in plurality of tubes 430 to air in cooling air flow path F. Similarly, the flow area of first outlet portion 414 and the flow area of second outlet portion 416 may be less than the flow area of inlet portion 412.

In various embodiments, HEX 400 may be configured such that the flow area of inlet portion 412 is equal to the flow area of first outlet portion 414 and the flow area of second outlet portion 416. In various embodiments, two outlets may enable the length of plurality of tubes 430 to be decreased while maintaining similar heat transfer between hot air flow path E and cooling air flow path F, in comparison with a single outlet design. A pressure drop (or difference) may exist between inlet portion 412 and both first outlet portion 414 and second outlet portion 416. In various embodiments, splitting the flow of hot air flow path E in half between first outlet portion 414 and second outlet portion 416 may decrease the pressure drop between the inlet and outlet by half, in comparison with a single outlet design. Stated another way, having two outlets, with hot air flow path E split between the two outlets via plurality of tubes 430, may decrease the pressure drop between inlet portion 412 and outlet portions 414, 416 by half. It may be desirable to decrease the pressure drop between the inlet and outlet of HEX 400 in order to prevent reverse flow or stagnated flow through HEX 400.

Figure 9:
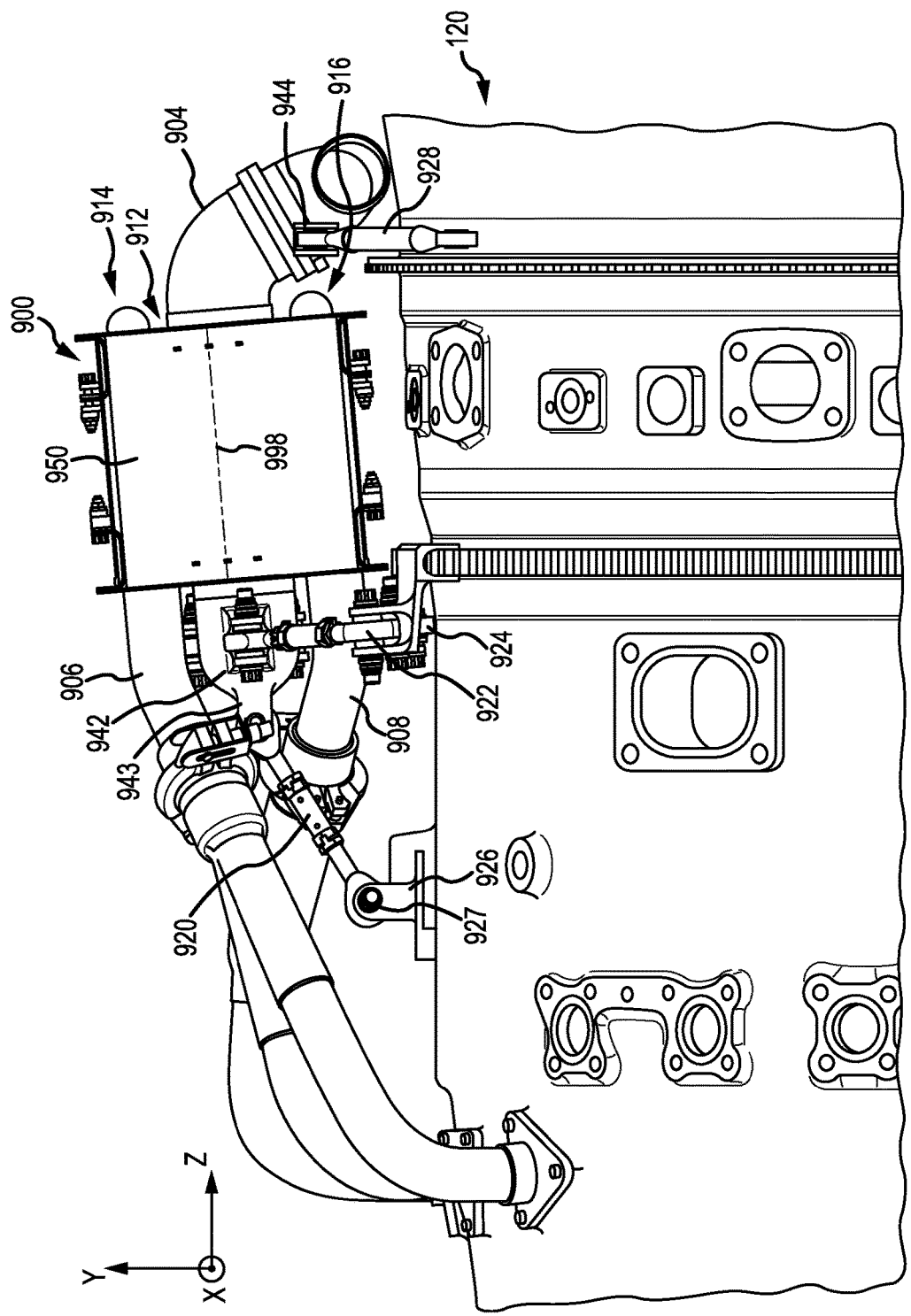
FIG. 9 illustrates a perspective view of a heat exchanger installed on a gas turbine engine, in accordance with various embodiments.

With respect to FIG. 9 a heat exchanger (HEX) installed on a gas turbine engine is illustrated, in accordance with various embodiments. In various embodiments, HEX 900 may be similar to HEX 400 as illustrated in FIG. 4. In various embodiments, HEX 900 may comprise an inlet portion 912, first outlet portion 914, second outlet portion 916, and a plurality of tubes (not shown in FIG. 9). HEX 900 may further comprise shroud 950. Inlet tube 904 may be coupled to inlet portion 912 of HEX 900. First outlet tube 906 may be coupled to first outlet portion 914 of HEX 900. Second outlet tube 908 may be coupled to second outlet portion 916 of HEX 900.

In various embodiments, HEX 900 may be coupled to core engine 120 via first attachment feature 942 and second attachment feature 944. In various embodiments, first attachment feature 942 may be similar to first attachment feature 442 as illustrated in FIG. 4. In various embodiments, second attachment feature 944 may be similar to second attachment feature 444 as illustrated in FIG. 4. In various embodiments, first attachment feature 942 may be coupled to core engine 120 via one or more links, such as first link 920 for example.

In various embodiments, first link 920 may be a turnbuckle link. FIG. 9 illustrates first attachment feature 942 comprising a plurality of tabs, such as tab 943 for example. A bolt or fastener may be inserted through one or more apertures in link 920 and one or more apertures in tab 943 to couple link 920 and first attachment feature 942. First link 920 may extend generally in the z-direction. Second link 922 and third link 924 may be coupled to first attachment feature in a similar manner as first link 920. Second link 922 may extend away from first attachment feature 942 generally in the negative x-direction. Third link 924 may extend away from first attachment feature 942 generally in the positive x-direction. Accordingly, first attachment feature may be fixed in space. Stated another way, first attachment feature may be fixed in the x, y, and z-directions.

In various embodiments, second attachment feature 944 may be coupled to core engine 120. Second attachment feature 944 may be coupled to core engine 120 via fourth link 928. In various embodiments, second attachment feature 944 may be coupled to core engine 120 such that second attachment feature 944 may be free to move in the z-direction. Accordingly, second attachment feature 944 may be configured to freely expand away from or contract towards first attachment feature 942 with HEX 900 in response to an increase or decrease in temperature, respectively. In various embodiments, with momentary reference to FIG. 2, centerline 998 of HEX 900 may be oriented at an angle in the range from about zero degrees (0°) to about five degrees (5°), wherein the term "about" in this context can only mean +/−3°. In various embodiments, centerline 998 of HEX 900 may be oriented at an angle of about five degrees) (5°), wherein the term "about" in this context can only mean +/−2°.

In various embodiments, with reference to FIG. 10A, a cross-section view of a heat exchanger 10 is illustrated. With momentary reference to FIG. 4, heat exchanger 10 may be similar to HEX 400. In various embodiments, heat exchanger 10 may comprise an inlet 12, an outlet 14, one or more tubes, such as plurality of tubes 20, and a baffle 16. In various embodiments, plurality of tubes 20 may include tube 22, for example. Tube 22 may comprise a first end 24 and a second end 26. First end 24 may be coupled to inlet 12. Second end 26 may be coupled to outlet 14. In various embodiments, air for cooling (or hot air) may enter inlet 12, travel through hot air flow path 40 into plurality of tubes 20, and exit plurality of tubes 20 into outlet 14. In various embodiments, with momentary reference to FIG. 4, baffle 16 may be similar to baffle 436.

Figure 10B:
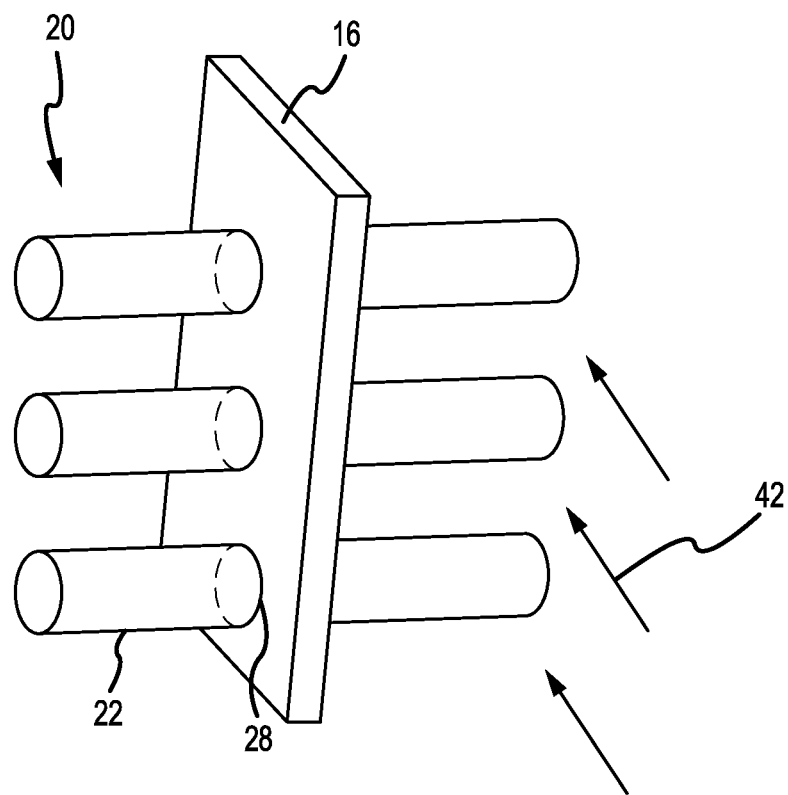
FIG. 10B illustrates a perspective view of a baffle for a heat exchanger, in accordance with various embodiments.

With reference to FIG. 10A and FIG. 10B, a perspective view of baffle 16 is illustrated in FIG. 10B, in accordance with various embodiments. Plurality of tubes 20 may be inserted into one or more apertures, such as aperture 28 for example, in baffle 16. In various embodiments, baffle 16 may be fixed to an adjacent component such as a heat exchanger shroud or other fixed object. Cooling air flow path 42 may comprise air which flows across plurality of tubes 20. In various embodiments, heat may be transferred from air in hot air flow path 40 to air in cooling air flow path 42. Thus, air entering heat exchanger 10 may comprise a greater temperature than air exiting heat exchanger 10. In various embodiments, plurality of tubes 20 may extend in the x-direction. In various embodiments, cooling air flow path 42 may flow generally in the z-direction. Thus, cooling air flow path 42 and hot air flow path 40 may form a cross-flow. However, cooling air flow path 42 and hot air flow path 40 may comprise a cross-flow, counter-flow, co-flow, or any other type of flow. Stated another way, the orientation of hot air flow path 40 relative to cooling air flow path 42 may be in any direction.

Figure 10C:
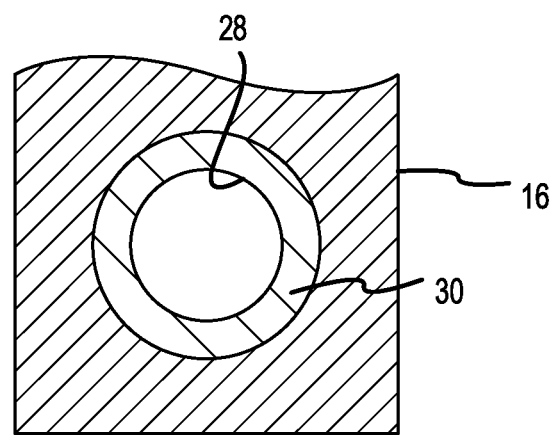
FIG. 10C illustrates a baffle with a oxidized layer, in accordance with various embodiments.

In various embodiments, with reference to FIG. 10C, baffle 16 may be made of a cobalt alloy (e.g., HAYNES 188) or other materials suitable to create an oxidized layer when exposed to temperatures that may exceed 1,000° F. (538° C.) degrees. In various embodiments, baffle 16 may be configured to form an oxidized layer 30 over an outer surface, such as aperture 28, of the baffle in response to an increase in temperature. In various embodiments, with further reference to FIG. 10A, the oxidized layer 30 may provide a lubricating surface over which plurality of tubes 20 may easily slide across. For example, tube 22 may expand or contract in an axial direction (x-direction in FIG. 10A) in response to an increase or decrease, respectively, in temperature. Thus, tube 22 may easily slide through aperture 28 across oxidized layer 30. Oxidized layer 30 may prevent or lessen stress in heat exchanger 10 during expansion and/or contraction.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A heat exchanger for cooling air in a gas turbine engine comprising:
    a central manifold comprising a central inlet portion, a first outlet portion, and a second outlet portion, the first outlet portion disposed proximate the central inlet portion and the second outlet portion disposed opposite the first outlet portion relative to the central inlet portion;
    a plurality of tubes coupled to the central manifold, the plurality of tubes comprising at least a first plurality of tubes, a second plurality of tubes, a third plurality of tubes, and a fourth plurality of tubes;
    a shroud at least partially encasing said plurality of tubes; and
    a cooling air flow path defined by at least one of the shroud, the plurality of tubes, and an outer surface of the central manifold, wherein the cooling air flow path is orthogonal to said plurality of tubes; wherein
    the first plurality of tubes are coupled between a first quadrant of the central inlet portion and a first half of the first outlet portion;
    the second plurality of tubes are coupled between a second quadrant of the central inlet portion and a second half of the first outlet portion, wherein a first tube from the first plurality of tubes has a first straight portion and a first rounded portion and a second tube from the second plurality of tubes has a second straight portion and a second rounded portion;
    the third plurality of tubes are coupled between a third quadrant of the central inlet portion and a first half of the second outlet portion; and
    the fourth plurality of tubes are coupled between a fourth quadrant of the central inlet portion and a second half of the second outlet portion, wherein a third tube from the third plurality of tubes has a third straight portion and a third rounded portion and a fourth tube from the fourth plurality of tubes has a fourth straight portion and a fourth rounded portion; and wherein
    the cooling air flow path receives air from a bypass flow path of the gas turbine engine.

2. The heat exchanger of claim 1, wherein a flow area of at least one of the first plurality of tubes, the second plurality of tubes, the third plurality of tubes, and the fourth plurality of tubes is less than 5% of the flow area of the central inlet portion.

3. The heat exchanger of claim 1, wherein the shroud includes a flow tab, the flow tab configured to contain the cooling air flow path in close proximity to the plurality of tubes.

4. The heat exchanger of claim 1, wherein the central inlet portion is configured to receive air from a high pressure compressor section of the gas turbine engine.

5. The heat exchanger of claim 1, wherein the heat exchanger further comprises a first attachment feature configured to be fixed to the gas turbine engine via a first adjustable damper and a second attachment feature configured to be coupled to the gas turbine engine via a second adjustable damper, wherein the second attachment feature may freely expand away and contract towards the first attachment feature with the heat exchanger, and wherein at least one of the first attachment feature or the second attachment feature at attached to the gas turbine engine via an adjustable damper, the adjustable damper comprising a fifth tube located at least partially within a sixth tube, and a spring member coupled between an adjusting member and a moveable member.

6. The heat exchanger of claim 1, wherein at least one of the central inlet portion, the first outlet portion, and the second outlet portion defines a cylindrical geometry.

7. A gas turbine engine comprising:
a compressor section; and
an air-to-air heat exchanger in fluid communication with the compressor section, comprising:
a central manifold comprising a central inlet portion, a first outlet portion, and a second outlet portion, the first outlet portion disposed proximate the central inlet portion and the second outlet portion disposed opposite the first outlet portion relative to the central inlet portion;
a plurality of tubes coupled to the central manifold, the plurality of tubes comprising at least a first plurality of tubes, a second plurality of tubes, a third plurality of tubes, and a fourth plurality of tubes;
a shroud at least partially encasing said plurality of tubes; and
a cooling air flow path defined by at least one of the shroud, the plurality of tubes, and an outer surface of the central manifold, wherein the cooling air flow path is orthogonal to said plurality of tubes; wherein
the first plurality of tubes are coupled between a first quadrant of the central inlet portion and a first half of the first outlet portion;
the second plurality of tubes are coupled between a second quadrant of the central inlet portion and a second half of the first outlet portion, wherein a first tube from the first plurality of tubes has a first straight portion and a first rounded portion and a second tube from the second plurality of tubes has a second straight portion and a second rounded portion;
the third plurality of tubes are coupled between a third quadrant of the central inlet portion and a first half of the second outlet portion; and
the fourth plurality of tubes are coupled between a fourth quadrant of the central inlet portion and a second half of the second outlet portion, wherein a third tube from the third plurality of tubes has a third straight portion and a third rounded portion and a fourth tube from the fourth plurality of tubes has a fourth straight portion and a fourth rounded portion; and wherein
the cooling air flow path receives air from a bypass flow path of the gas turbine engine.

8. The gas turbine engine of claim 7, wherein a flow area of at least one of the first plurality of tubes, the second plurality of tubes, the third plurality of tubes, and the fourth plurality of tubes is less than 5% of the flow area of the central inlet portion.

9. The gas turbine engine of claim 7, wherein the shroud includes a flow tab, the flow tab configured to contain the cooling air flow path in close proximity to the plurality of tubes.

10. The gas turbine engine of claim 7, wherein the central inlet portion is configured to receive air from the compressor section of the gas turbine engine.

11. The gas turbine engine of claim 7, wherein the air-to-air heat exchanger further comprises a first attachment feature configured to be fixed to the gas turbine engine via first adjustable damper and a second attachment feature configured to be coupled to the gas turbine engine via a second adjustable damper, wherein the second attachment feature may expand away and contract towards the first attachment feature with the air-to-air heat exchanger.

12. The gas turbine engine of claim 7, wherein at least one of the central inlet portion, the first outlet portion, or the second outlet portion defines a cylindrical void.

* * * * *